Patented July 12, 1949

2,475,970

UNITED STATES PATENT OFFICE 2,475,970

LUBRICANTS

Eugene Lieber, Chicago, Ill., and Raymond M. Dean, Westfield, N. J., assignors to Standard Oil Development Company, a corporation of Delaware No Drawing. Application September 6, 1946, Serial No. 695,290

1 Claim. (Cl. 252—59)

This invention relates to novel chemical products and to methods of preparing same, and more particularly it relates to the preparation of chemical condensation products having improved wax-modifying properties, particularly for use as pour depressors for waxy mineral lubricating oils.

It is known that wax modifying agents may be prepared by condensation of relatively long chain paraffinic materials such as chlorinated paraffin wax or olefins corresponding thereto, with aromatic hydrocarbons such as naphthalene, benzene, toluene, anthracene, phenanthrene, mixed coal tar aromatics, etc., as well as hydroxy or amino derivatives of such aromatic hydrocarbons, e. g. phenol, cresols, naphthols, aniline, xylidine, etc.

The condensation of such materials has generally been carried out in the presence of a Friedel-Crafts catalyst such as aluminum chloride, zinc chloride, boron fluoride, etc., preferably in the presence of an inert solvent such as a refined kerosene, tetrachloroethane, dichlorbenzene, etc., and at a temperature ranging from about room temperature to about 300° F., and generally using proportions of about 2 to 5 mols of the chlorwax type of constituent to 1 mol of the aromatic constituent. For example, about 10 to 20 parts by weight of chlorinated paraffin wax having about 10 to 20% chlorine, preferably about 12 to 15% chlorine, in the presence of about 10 to 300 parts, preferably about 25 to 100 parts, by weight of a refined kerosene solvent, and using about 1 to 3% by weight of aluminum chloride catalyst based on the weight of the chlorinated paraffin wax, starting the reaction at room temperature, and gradually raising the temperature of the reaction mixture to a final temperature of about 90° F. to 125° F. for about 5 hours. Residual catalyst may then be hydrolyzed and removed by washing with water, alcohol, aqueous caustic soda or dilute hydrochloric acid, etc., settling and drawing off the resultant sludge, and finally the desired high molecular weight Friedel-Crafts condensation product is recovered from the reaction mass by distillation under reduced pressure such as under vacuum of about 1 to 50 mm. mercury absolute pressure, or by fire and steam distillation, to a temperature of about 600° F.

The distillation residue thus obtained is a wax-modifying agent which is oil-soluble, has an average molecular weight above about 1,000, preferably about 1,500 to 10,000, and generally has very good pour depressing properties as determined by the standard ASTM pour point test. For instance, when added in amount ranging from 0.1 to 2.0% to a waxy mineral lubricating oil having a pour point of +30° F., the resulting blend will generally have pour points ranging from −10° F. or −20° F. down to below −35° F. which is generally the lowest temperature tested.

However, under field conditions of winter storage, where the oil blends are subjected to frequent fluctuations of high and low temperatures, these blends have sometimes been found to be solid at temperatures substantially above the ASTM pour points, and these blends did not show as good pour stability as measured by the Test V procedure (described in the Oil and Gas Journal June 24, 1943), as might be desired. It is one of the primary objects of the present invention to modify those Friedel-Crafts condensation products in such way as to produce pour depressors having improved pour stability.

The present invention is based on the discovery that when such wax modifiers and pour depressors are made by Friedel-Crafts condensation of a chlorinated long chain aliphatic hydrocarbon such as paraffin wax with an aromatic compound such as naphthalene, the pour stability of the resulting high molecular weight condensation product may be improved to a very surprising extent by subsequent Friedel-Crafts condensation with an olefin, preferably one having about 5 to 20 carbon atoms and especially branched olefins such as diisobutylene, triisobutylene, tetraisobutylene, or other lower olefins or polyolefins, i. e. lower polymerized olefins.

This subsequent condensation is preferably carried out by using about 5 to 10 mols of the olefin with about 1 mole of the original alkyl-aromatic condensation product, such as the wax-naphthalene condensation product, based on an assumed molecular weight of about 2,000. The amount of catalyst to be used should be about 1 to 5% based on the weight of mixed reactants, and this catalyst may be anhydrous aluminum chloride, or boron fluoride or any other suitable Friedel-Crafts catalyst. The reaction is also preferably carried out in the presence of about 0.1 to 5 volumes, preferably about 0.2 to 2 volumes of inert solvent per volume of mixed reactants. Such inert solvent may suitably be the volatile petroleum distillate such as a refined heavy naphtha or kerosene, or it may be a suitably highly chlorinated hydrocarbon such as tetrachlorethane or orthodichlorbenzene.

The reaction may be carried out in substantially the same way as the original condensation, as for instance, by dissolving the desired amount of original high molecular weight condensation product and olefin in the solvent and adding the aluminum chloride catalyst at room temperature, and then raising the temperature to the desired final reaction temperature which is generally about 100 to 200° F., preferably about 125 to 175° F. for a suitable reaction period ranging from about 1 to 10 hours, determined inversely according to the reaction temperature used.

After the reaction has been completed, the reaction mixture is preferably cooled, with or without dilution with a further amount of volatile solvent, then the catalyst is destroyed by adding an alcohol-water mixture or other suitable hydrolyzing agent. After removing the catalyst sludge by settling or centrifuging, the solvent extract layer is then distilled under reduced pressure, such as by fire and steam up to about 600° F., or by substantially corresponding vacuum distillation at for instance an absolute pressure of about 1 to 50 mm. mercury.

The distillation residue is an olefin-recondensed high molecular weight alkyl-aromatic condensation product, and is found to be a pour depressor having superior pour stability compared to that of the original condensation product. The exact structure of this recondensed product is not known, because although many of the olefin molecules may have attached themselves to a single aromatic nucleus by a simple process of alkylation, it is also possible that some of the olefin molecules may have combined with two different aromatic nuclei and thus may have served to interlink two large molecules of the original condensation product.

The invention will be better understood by a consideration of the following experimental data.

An original pour depressor was made by condensing 100 parts of chlorinated paraffin wax having a chlorine content of about 13%, with 15 parts by weight of naphthalene, in the presence of 40 parts by weight of refined kerosene as solvent, using 2.5 parts by weight of aluminum chloride as catalyst, and the reaction mixture being maintained at a final reaction temperature of about 90° F. for about 5 hours; then the catalyst was hydrolyzed and removed and the reaction product subjected to fire and steam distillation up to about 600° F. to obtain the desired initial condensation product as distillation residue.

200 grams of this initial condensation product, and 80 grams of diisobutylene were dissolved in 300 cc. of tetrachlorethane. The temperature was adjusted to about 87° F., and 10 grams of aluminum chloride were added, causing the temperature to rise to 125° F. The reaction temperature was then raised to 150° F. and maintained thereat for 4 hours. At the end of this time the reaction mixture was cooled and diluted with 800 cc. of refined kerosene solvent, and the aluminum chloride was destroyed with an alcohol-water mixture. After settling and discarding the aqueous catalyst sludge, the kerosene extract was distilled with fire and steam to about 600° F. to remove solvent and the volatile portions of the reaction product. A yield of 234 grams of viscous green oil was obtained as final condensation product.

This diisobutylene-recondensed wax-naphthalene pour depressor was then blended in a waxy lubricating oil in several concentrations, and the resulting blends were subjected to pour point tests by the regular ASTM procedure. The results were as follows:

| | Pour point, °F. |
|---|---|
| Original oil | +30 |
| Original oil+0.075% product | 0 |
| Original oil+0.15% product | −15 |

The pour stability properties of this recondensation product were tested by first dissolving it in a small amount of paraffinic blending oil to make a concentrate having ASTM pour depressing characteristics equivalent to similar commercial concentrates of the original wax-naphthalene condensation product, and then these concentrates, of the original and final condensation products, were tested in 1% blends in a paraffinic mineral lubricating oil basestock having a viscosity of about 160 seconds Saybolt at 100° F., and containing 3.5% of Pennsylvania bright stock, and then these two blends were tested for pour stability by the Test V procedure previously referred to. The results of these tests were as follows:

| | Solid Point in Cycle II of Test V, °F. |
|---|---|
| Initial condensation product | +25. |
| Final recondensation product (present invention) | below −10.[1] |

[1] Did not go solid.

These data indicate that when the original wax-naphthalene condensation product was recondensed with diisobutylene, the resulting recondensation product had a tremendously better pour stability than the original condensation product, since the solid point in the second cycle of the pour stability test was 35° F. lower for the recondensation product than it was for the original condensation product.

It is not intended that this invention be limited to the specific materials which have been mentioned merely for the sake of illustration but only by the appended claim.

We claim:

A lubricating oil composition consisting essentially of a major proportion of waxy mineral lubricating oil containing dissolved therein a pour depressing amount of a Friedel-Crafts condensation product of from 5 to 10 mols of diisobutylene and 1 mol of an initial Friedel-Crafts condensate having a molecular weight of at least 1,000 and being substantially non-volatile up to 600° F. obtained by condensing from 2 to 5 mols of a chlorinated paraffin wax containing from 10 to 20% chlorine and 1 mol of naphthalene at a temperature ranging from room temperature to about 300° F., said recondensation of said initial condensate and diisobutylene taking place at a temperature ranging from 100 to 200° F.

EUGENE LIEBER.
RAYMOND M. DEAN.

REFERENCES CITED

The following references are of record in the file of this patent:

UNITED STATES PATENTS

| Number | Name | Date |
|---|---|---|
| 2,072,120 | Milkeska | Mar. 2, 1937 |
| 2,361,065 | Schmerling | Oct. 24, 1944 |
| 2,394,560 | Otto et al. | Feb. 12, 1946 |
| 2,411,047 | Linn | Nov. 12, 1946 |
| 2,412,229 | Schaad | Dec. 10, 1946 |